United States Patent [19]
Clark

[11] 3,912,526
[45] Oct. 14, 1975

[54] REFRACTORIES

[75] Inventor: Norman Owen Clark, Cornwall, England

[73] Assignee: English Clays Lovering Pochin & Company Limited, England

[22] Filed: Oct. 1, 1973

[21] Appl. No.: 402,381

[30] Foreign Application Priority Data
Oct. 5, 1972   United Kingdom............... 46071/72

[52] U.S. Cl. ...................... 106/55; 106/57; 106/58; 106/65; 106/63; 106/67; 106/72
[51] Int. Cl.² ................C04B 35/04; C04B 35/10; C04B 35/48
[58] Field of Search ............ 106/58, 55, 63, 57, 65, 106/67, 72; 210/224, 229, 231, 348

[56] References Cited
UNITED STATES PATENTS

| | | | |
|---|---|---|---|
| 2,339,264 | 1/1944 | Heany................................... | 106/65 |
| 2,347,685 | 5/1944 | Heany................................... | 106/65 |
| 2,399,225 | 4/1946 | Heany................................... | 106/65 |
| 2,571,102 | 10/1951 | Austin.................................... | 106/58 |
| 2,815,292 | 12/1957 | Thiele.................................... | 106/72 |
| 3,231,402 | 1/1966 | Leatham............................... | 106/58 |

*Primary Examiner*—J. Poer
*Attorney, Agent, or Firm*—Larson, Taylor and Hinds

[57] ABSTRACT

An improved process for producing a refractory material is described in which an aqueous suspension of a raw material is dewatered and the dewatered solid thus obtained is calcined to form the desired refractory, the improvement comprising dewatering the aqueous suspension of the raw material at a specified pressure.

13 Claims, No Drawings

REFRACTORIES

BACKGROUND OF THE INVENTION

This invention relates to the manufacture of refractory materials.

In the manufacture of many refractory materials there is obtained at an early stage in the manufacturing process an aqueous suspension of the raw material. This suspension is dewatered, for example by vacuum filtration or by pressure filtration in a conventional plate and frame recess plate filter. The product of the dewatering process is then calcined, often after having been subjected to intermediate process steps such as to pelletising and briquetting. Calcining generally takes place at a temperature greater than about 1,500°C in a tunnel or rotary kiln in order to obtain the desired refractory material. Examples of raw materials in the processing of which there may be formed an aqueous suspension include raw materials which initially are in bulk form, for example dolomite, and which are ground and crushed; raw materials which initially are in the form of a finely divided solid e.g. kaolin clays; and raw materials which are formed by a process of chemical precipitation, for example magnesium hydroxide. In modifications of the general process outlined above other steps may be introduced for example materials originally in the form of carbonates may be subjected to a preliminary calcination treatment at approximately 1,000°C in order to remove carbon dioxide prior to the final high temperature calcination. Examples of refractories in the manufacture of which a process such as that described above is frequently used include calcined kaolin clays, such as that sold under the Trade Mark "MOLOCHITE," other calcined aluminosilicates, aluminas, magnesias, dolomites, magnesium aluminate spinnels, zirconia, berylia etc.

A property of refractories which is of particular importance is their stability under gravitational loads when held at elevated temperatures for long periods i.e. their refractoriness under load. Heretofore, in order to improve this property is has been usual to calcine the raw materials at very high temperatures and to include a briquetting or pelletising step in the process prior to the calcination of the raw material.

SUMMARY OF THE INVENTION

We have now found that if the initial filtration process is carried out at pressures substantially higher than those conventionally used and the dewatered product thus obtained then subjected to calcination there can be obtained a product with superior refractory properties. Alternatively, if improved refractoriness under load is not required the calcination temperature can be reduced with consequent savings in cost.

More particularly, in accordance with the present invention there is provided in a process for producing a refractory material in which an aqueous suspension of a raw material is dewatered and the dewatered solid is calcined to form the desired refractory, the improvement which comprises dewatering the aqueous suspension of the raw material at a pressure greater than 700 pounds per square inch gauge (p.s.i.g.) (i.e., 4.8 Meganewtons per square metre).

DESCRIPTION OF THE PREFERRED EMBODIMENTS

The dewatering of the raw material at a pressure greater than about 700 p.s.i.g. (4.8 $MN/m^2$) can be conveniently achieved by means of a tube pressure filter of the type described in British Patent specifications Nos. 1,240,465 and 1,240,466. When operating at pressures in the range 700 to 1,500 p.s.i.g. (4.8 $MN/m^2$ to 10.4 $MN/m^2$), a plate filter press of the type described in our copending British Patent application No. 3757/71 may be employed.

The dewatering of the raw material is advantageously effected at a pressure greater than about 1,500 p.s.i.g. (10.4 $MN/m^2$).

The product of the high pressure dewatering step can be calcined directly, after briquetting or pelletising or after shaping in a mould.

The invention is illustrated by the following Examples:

EXAMPLE 1

Using a tube pressure filter of the type described in British Patent specification No. 1,240,465, a kaolin clay was dewatered at a pressure in excess of 1,500 p.s.i.g. which was subsequently calcined at a temperature of 1,500°C in a tunnel kiln. In this way the porosity of the MOLOCHITE which was obtained was reduced from a conventional figure in the range 5 to 10 percent to less than 3 percent the porosity being measured according to the test procedure given in B.S. 1092: Part 1A: 1966. The refractoriness under load of the material produced by the process of the invention and that of a conventionally prepared sample of MOLOCHITE was measured by one of the test procedures specified in B.S. 1092: Part 1A: 1966. The samples were subjected to a constant load of 28 p.s.i.g. (0.19 $MN/m^2$) at a temperature of 1,400°C for 100 hours after which time the subsidance of each sample was measured as a percentage of the length of the sample. The material produced by the process of the invention subsided by only 4.5 percent against a subsidance of 8.5 percent for the conventional material.

EXAMPLE 2

An aqueous suspension of precipitated magnesium hydroxide was dewatered using a tube pressure filter of the type described in British Patent specification No. 1,240,465. The dewatered solid thus obtained was calcined at conventional temperatures and it was found that the porosity was reduced from 10 percent, using a conventional technique, to 5.6 percent using the process of the invention, the porosity being measured in the same way as in Example 1. The refractoriness under load of the material produced by the process of the invention and that of a conventionally prepared sample of magnesia was measured by one of the test procedures specified in B.S. 1092: Part 1A: 1966. The samples were subjected to a constant load of 28 p.s.i.g. (0.19 $MN/m^2$) at a temperature of 1,600°C and the time which elapsed before failure of the sample (as defined in the British Standard quoted above) occurred was noted. The conventional material failed after 11 minutes whereas the material produced by the process of the invention did not fail until 32 minutes had elapsed.

What is claimed is:

1. In a process for producing a refractory material in which an aqueous suspension of a raw material is dewatered and the dewatered solid thus obtained is calcined to form the desired refractory, the improvement which comprises dewatering the aqueous suspension of the raw material at a pressure which is greater than 700 lbs per square inch gauge.

2. A process according to claim 1, wherein said pressure is greater than 1,500 lbs per square inch gauge.

3. A process according to claim 2, wherein the dewatering of the aqueous suspension of the raw material is effected in a tube pressure filter.

4. A process according to claim 1, wherein the aqueous suspension of the raw material consists of an aqueous suspension of an aluminosilicate.

5. A process according to claim 4, wherein said aluminosilicate is a kaolin clay.

6. A process according to claim 1, wherein said aqueous suspension of the raw material is an aqueous suspension of alumina.

7. A process according to claim 1, wherein said raw material is a compound selected from the group consisting of the hydroxides and carbonates which give rise to a refractory material upon calcining.

8. A process according to claim 7, wherein said raw material is selected from the group consisting of the hydroxides and carbonates of aluminum, magnesium, calcium, zirconium and beryllium.

9. A process according to claim 8, wherein said raw material is magnesium hydroxide.

10. A process according to claim 8, wherein said raw material is dolomite.

11. A process according to claim 1, wherein said raw material is a magnesium aluminate spinel.

12. A process according to claim 3, wherein said raw material is a compound selected from the group consisting of the hydroxides and carbonates which give rise to a refractory material upon calcining.

13. A process according to claim 3, wherein said raw material is selected from the group consisting of kaolin, alumina and magnesium hydroxide.

* * * * *